United States Patent [19]

Ungruh et al.

[11] Patent Number: 4,926,619
[45] Date of Patent: May 22, 1990

[54] HAY-MAKING MACHINE

[75] Inventors: Josef Ungruh, Rheine; Maximilian Rohlmann, Hörstel-Riesenback, both, Fed. Rep. of Germany

[73] Assignee: H. Niemeyer Söhne GmbH & Co. KG, Hörstel-Riesenback, Fed. Rep. of Germany

[21] Appl. No.: 272,144

[22] Filed: Nov. 16, 1988

[30] Foreign Application Priority Data

Nov. 20, 1987 [DE] Fed. Rep. of Germany ....... 8715405

[51] Int. Cl.⁵ .................... A01B 73/02; A01D 80/00; A01D 78/10
[52] U.S. Cl. ........................................ 56/15.4; 56/377; 56/396
[58] Field of Search .................. 56/14.9, 15.4, 377, 56/376, 370, 396, DIG. 21

[56] References Cited

U.S. PATENT DOCUMENTS

| | | | |
|---|---|---|---|
| 1,913,034 | 6/1933 | Lindgren et al. | |
| 2,806,337 | 9/1957 | Rezabek | 56/15.4 |
| 3,165,162 | 1/1965 | Ganguet | |
| 4,478,032 | 10/1984 | Inskeep | 56/14.9 X |
| 4,685,282 | 8/1987 | Allen | 56/14.9 X |
| 4,723,401 | 2/1988 | Webster et al. | 56/377 |

FOREIGN PATENT DOCUMENTS

| | | |
|---|---|---|
| 2219357 | 11/1972 | Fed. Rep. of Germany |
| 7398134 | 8/1973 | Fed. Rep. of Germany |
| 8625784 | 4/1987 | Fed. Rep. of Germany |
| 8706316 | 7/1987 | Fed. Rep. of Germany |
| 2376606 | 8/1978 | France |
| 2401597 | 3/1979 | France |

*Primary Examiner*—Stephen J. Novosad
*Attorney, Agent, or Firm*—Jordan and Hamburg

[57] ABSTRACT

A hay-making machine operable to move along a straight line path and a curved path includes a central support along with elongated transverse supports pivotably connected to the central support and extending from opposite sides of the central support in a direction generally perpendicular to the straight line path. Raking devices and ground-support wheels are provided on each of the transverse supports. A drawbar structure is connected to the central support and extends generally forwardly of the central support, the drawbar structure being connectable to a tractor vehicle while an undercarriage is connected to the central support and extends generally rearwardly of the central support. Running wheels are rotatably mounted on the undercarriage, and a pivotal arrangement pivotably supports the running wheel for pivotable movement about generally vertical axes. A steering device is operably connected between the pivotal arrangement and a drawbar structure for pivoting and steering the running wheels in response to alignment changes between the hay-making machine and the tractor vehicle connected to the drawbar structure.

10 Claims, 4 Drawing Sheets

Fig.2
Fig.3
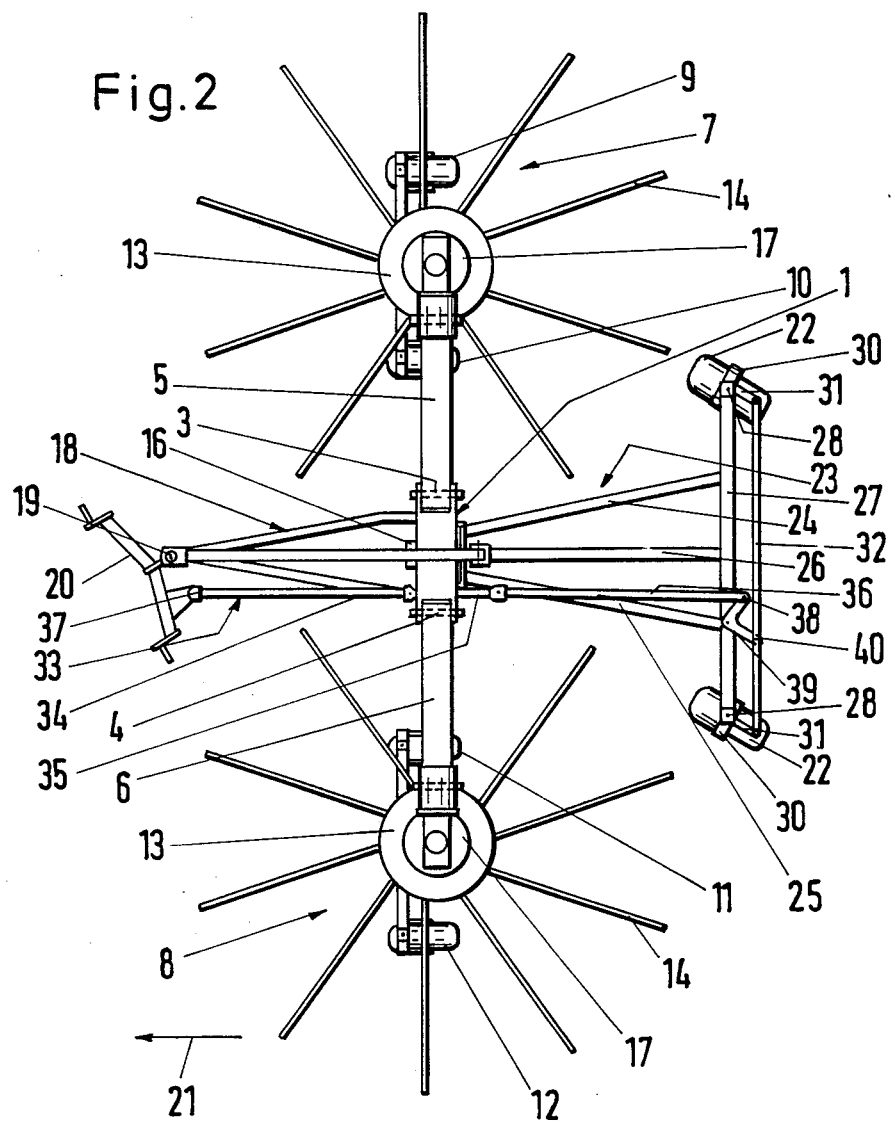
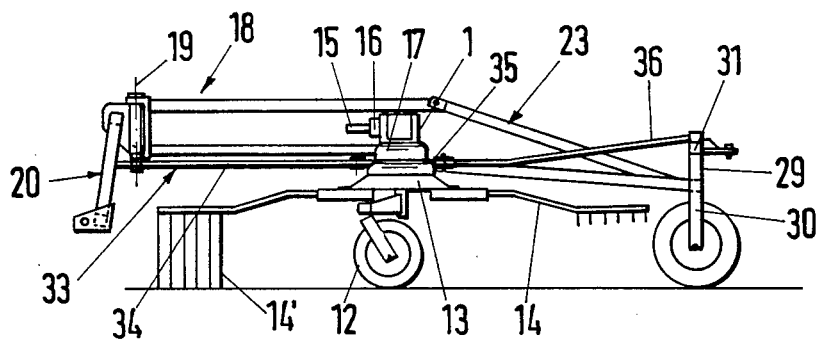

HAY-MAKING MACHINE

BACKGROUND OF THE INVENTION

The invention relates to a hay-making machine having enhanced maneuverability.

With a known machine of this type (FRG Utility Patent 8,706,316), the tractive drawbar has a connecting jaw for coupling the machine to the linkage drawbar of an agricultural tractor vehicle. The hay-making machine accordingly follows the tractor vehicle like a usual trailer unit.

This is also true of another known hay-making machine (FRG Utility Patent 7,318,934). This machine is supported on the ground solely by the support wheels of the circular rakes. The front end of the tractive drawbar of this machine makes a hinged connection with a mounting block that can be connected to the lifting arms of the three-point hydraulics of the tractor vehicle. When the machine is in its operating position, it can pivot freely within limits about the vertical connecting axle between the tractive drawbar and the mounting part.

Another known hay-making machine of the type mentioned in the introduction also has the front end of its tractive drawbar connected to a mounting part in such a manner that it can pivot within limits about a vertical connecting axle. The mounting part can be coupled only to the draft links of the three-point hydraulics of the tractor vehicle. This machine represents merely a trailer unit which, like all trailers, is restricted in its maneuverability.

SUMMARY OF THE INVENTION

It is an object of the invention to provide a hay-making machine of the type mentioned in the introduction, which is more maneuverable and which, more particularly, can make do with smaller headlands.

By designing the running wheels as steering wheels, maneuverability is greatly improved, both when the hay-making machine is in its operating position, in which the circular rakes are supported on the ground through their support wheels, and when the hay-making machine is in its transport position, in which the outside parts of the transverse support of the machine, together with the circular rakes that are fastened to them, are tilted up so as to reduce the width of the machine to the extent required for road transport. As a result of the better maneuverability, only much smaller headlands are needed.

An embodiment of the object of the invention is explained in more detail in connection with the accompanying drawings.

BRIEF DESCRIPTION OF THE DRAWINGS

FIG. 2 is a view similar to FIG. 1 showing the position of the parts of the hay-making machine when it runs along a curved path;

FIG. 3 is a schematic side view of FIG. 1;

DESCRIPTION OF THE PREFERRED EMBODIMENTS

Figure 1:
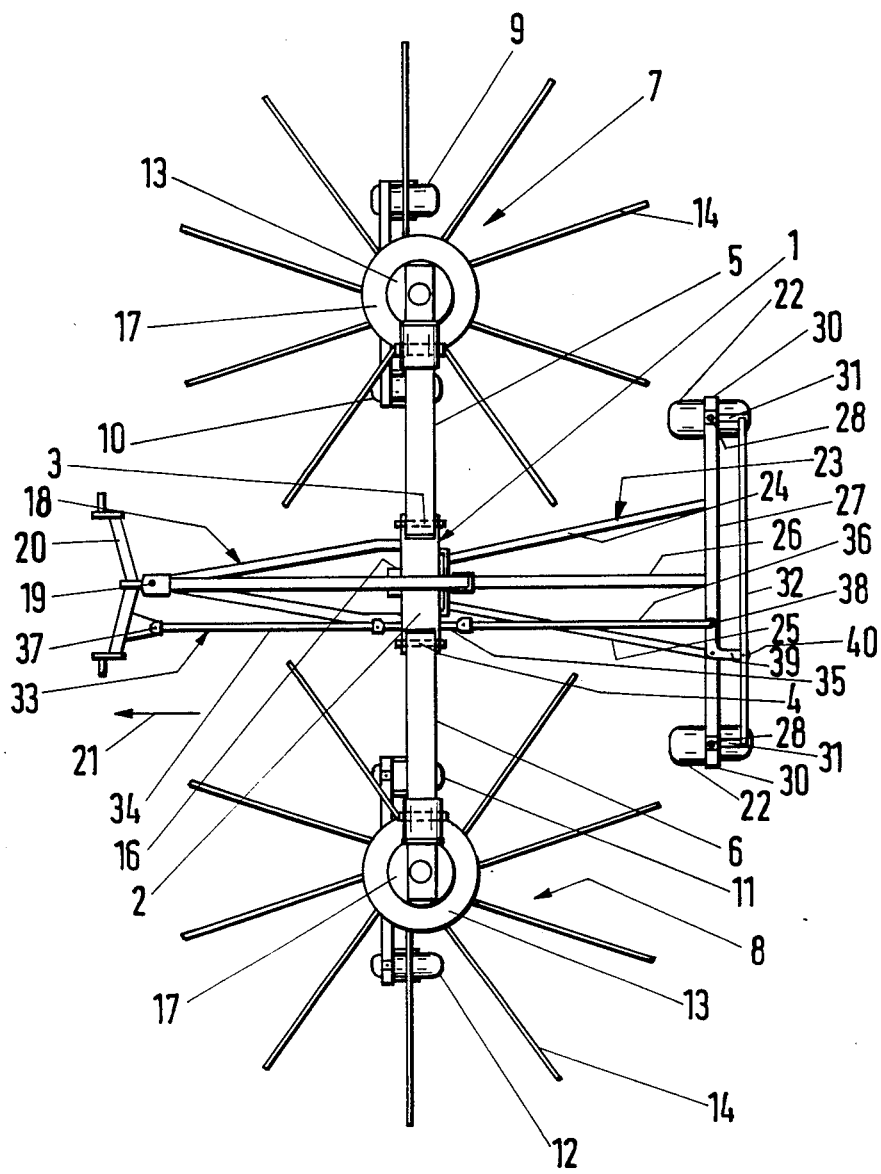
FIG. 1 is a top view of a hay-making machine showing the operating position of the parts when it runs along a straight path.

The hay-making machine, shown in the drawing comprises in particular a transverse support 1 for the machine, which has a middle part 2 and two outside parts 5, 6, each of which can be tilted up about a tilting axis 3, 4, which is parallel to the direction of motion. A circular rake 7, 8 is affixed to each of the outside parts 5, 6 of the transverse machine support 1. This circular rake is supported on the ground by two support wheels 9, 10 or 11, 12 respectively.

The circular rakes 7, 8 each consist of a central rotary body 13 and of prong arms 14, connected to said rotary body 13, and directed approximately star-shaped. The prong arms 14 have raking prongs 14' at their outer ends. They execute not only rotary motion about the vertical circle axis but also a pivoting motion about their middle axis. The latter motion is prescribed by a control gear. The circular rakes 7, 8 are driven from the tractor vehicle via a power take off which is connected to the input shaft 15 of a central transmission 16. Driveshafts, disposed in the transverse support 1 of the machine and not shown in more detail, lead to the angular gears 17, the drive shafts of which then each drive a circular rake 7, 8.

The middle part 2 of the transverse support 1 of the machine is connected to a rigid tractive drawbar 18, which can be connected to the agricultural tractor vehicle. In the example shown, the front end of said tractive drawbar is connected to a mounting part 20, so as to pivot within limits about a vertical connecting axle 19. The mounting part 20 can be coupled as a two-point support to the two draft links of the three-point hydraulics of the tractor vehicle.

On that back side, which faces away from the driving direction 21, the middle part 2 of the transverse support 1 of the machine is supported on the ground by two running wheels 22. The running wheels 22 are disposed uniaxially at some distance behind the middle part 2. They are affixed at an undercarriage 23, which extends rearwards from the middle part 2. This undercarriage 23 comprises a group of longitudinal struts 24, 25, 26, which engage the middle part 2 and the back side of which is connected to a transverse strut 27. At its ends, the transverse strut 27 has bearings 29 for the axle journals of the running wheel supports 30. The bearings 29 define the vertical axles 28. The axle journals are not visible in the drawing. Their upper ends are connected to steering levers 31, the free ends of which are connected by a tie rod 32, which guarantees the parallel guidance of the running wheels 22 and synchronizes their change of direction.

The tie rod 32 is part of a steering unit 33, by means of which the running wheels 22 can be steered as a function of alignment changes between the tractive drawbar 18 and the tractor vehicle that is connected to the hay-making machine. In the embodiment shown, the steering unit 33 comprises a drawbar and push bar 34, 35, 36 as activation element. Its forward end engages the mounting part at 37 by way of a hinge, at a lateral distance from the front end of the tractive drawbar 18.

The rearward end of the drawbar and push bar 34, 35, 36 engages one leg of the angle lever 39 at position 38. The angle lever 39 is pivotably mounted on the transverse strut 27 of the undercarriage 23. The other leg of the angle lever 39 is connected to the tie rod 32 at position 40, so as to make a hinge. This leg has an effective length and direction to correspond to the steering levers 31 of the wheel supports.

In view of the considerable length of the drawbar and push bar 34, 35, 36, this bar is supported at the middle part 2 of the transverse support 1 of the machine. In a preferred version, the drawbar and push bar 34, 35 is provided with a separate intermediate part 35, which is conducted along the middle part 2 of the transverse support 1 of the machine. It also comprises a forward part 34 and a rearward part 36. Each of these is respectively connected to the ends of the intermediate part 35, by way of a hinged connection. The subdivision and the hinged connection of the parts of the drawbar and push bar 34, 35, 36 permits it to be matched to the running wheels 22, for example when the height of the transverse support 1 of the machine is changed.

The intermediate part 35 can be movably guided in a longitudinal guide at the middle part 2 of the transverse support 1 of the machine. However, it can also form a double lever, which is guided pivotably about a pivoting axle at the middle part 2.

The mechanical design of the steering device 33 that is shown here is especially simple and robust and is sufficiently precise. It can be used not only if the mounting part 20 shown in present, but also when, for example, the front end of the tractive drawbar 18 is provided with a coupling jaw and is coupled to the linkage drawbar of the tractor vehicle. In this case, the front end of the drawbar and push bar 34, 35, 36 can likewise make a hinged connection with the linkage drawbar of the tractor vehicle, at a lateral distance from the coupling point of the tractive drawbar.

Figure 4:
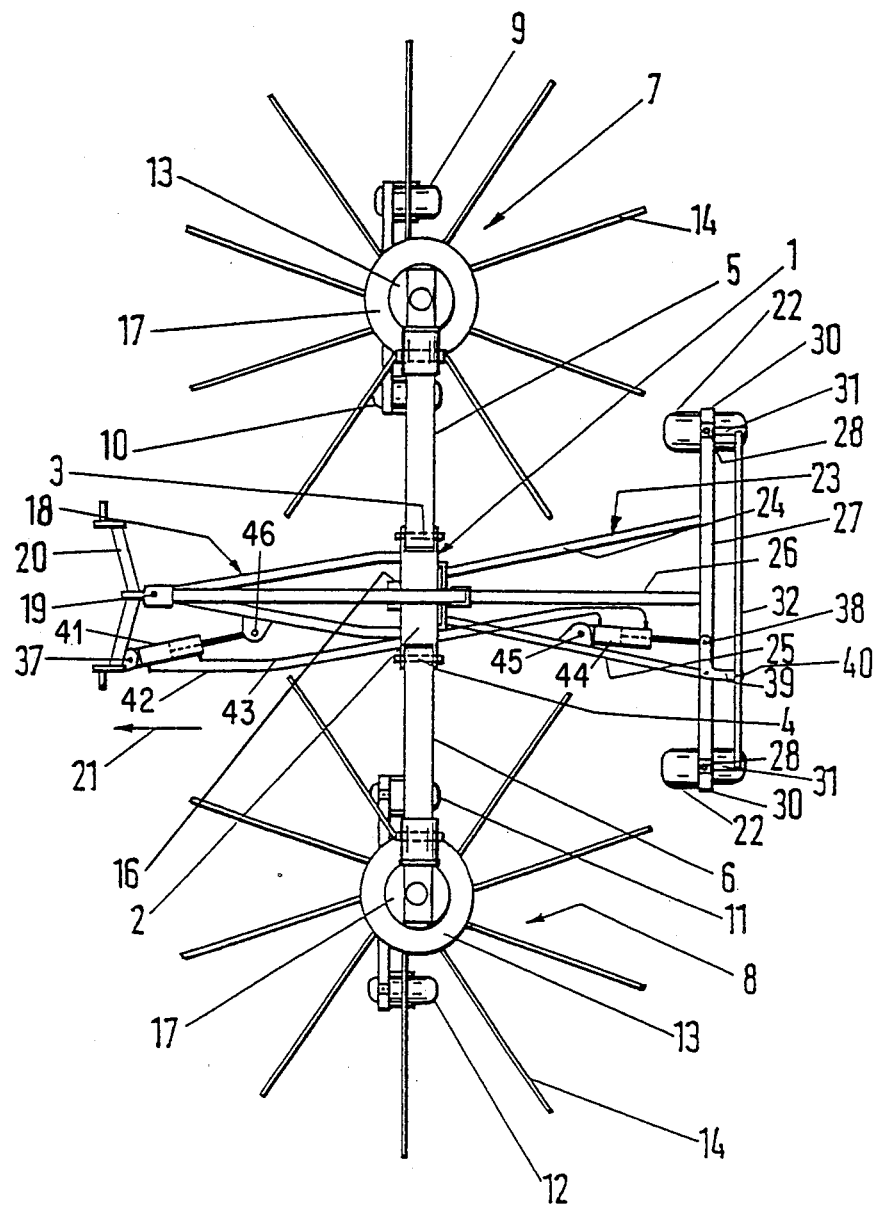
FIG. 4 is a top plan view of an alternate embodiment.
Figure 5:
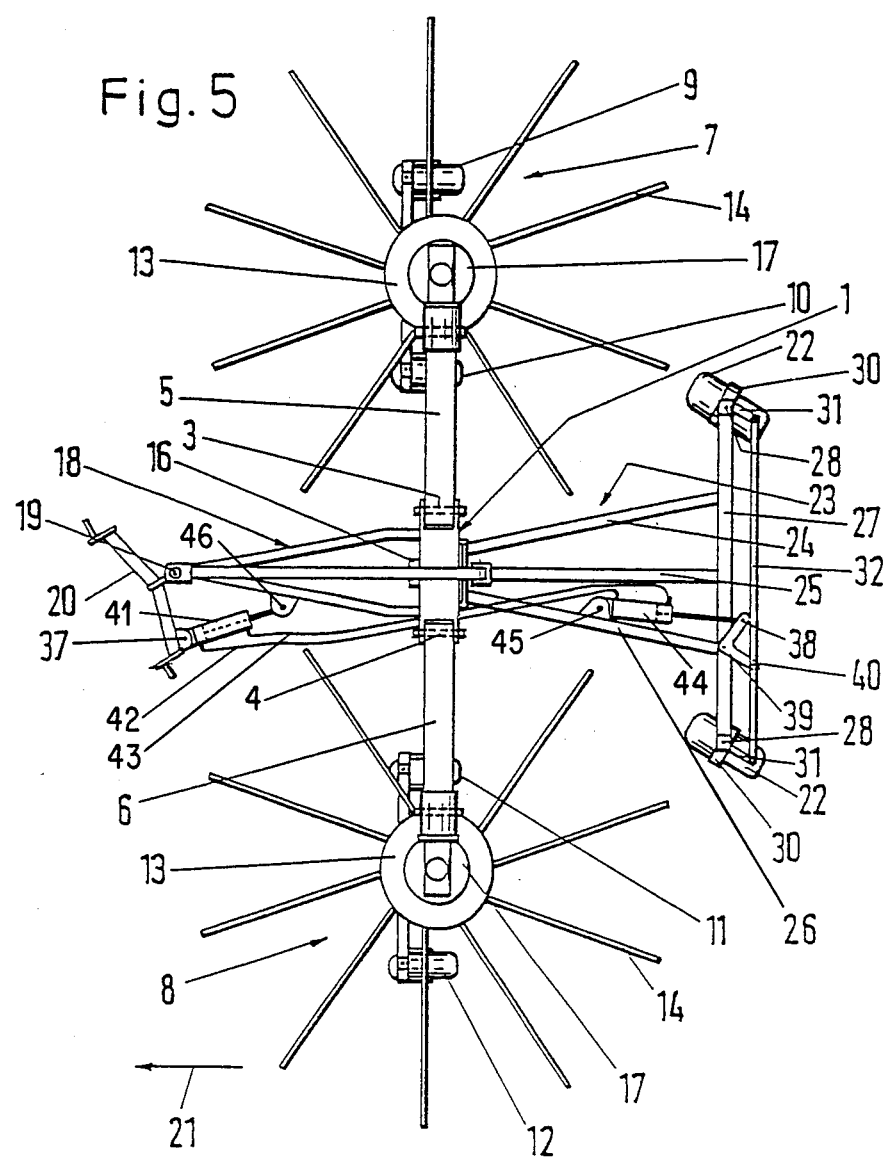
FIG. 5 is a view similar to FIG. 4 but showing a different operating position.

In place of a mechanical design, it is also possible to use a steering device with a hydraulic design as shown in FIGS. 4 and 5. This comprises a hydraulic generator 41, which is connected, via connecting lines 42, 43, to a hydraulic actuator 44, which can be attached at 45 to one of the struts 24, 25 or 26, respectively, and which engages at 38 the lever 39 engaging in turn the tie rod 32. In such a design, the generator, in the form of the hydraulic cylinder 41, can be attached by way of a hinge at 37 on the one hand to the mounting part 20 and on the other hand 46 to the front area of the tractive drawbar 18. Such a design likewise provides a steering activation for the running wheels 22 as a function of alignment changes between the tractive drawbar 18 and the tractor vehicle.

In the mechanical design shown, the mounting part 20 forms the component, which is rigidly connected to the tractor vehicle, and furthermore pivots about the vertical connecting axle 19, as soon as the tractor driver drives along a curve. The steering unit 33 transmits this pivoting motion to the running wheels 32 in the form of a steering excursion, as shown in FIG. 2.

We claim:

1. A hay-making machine moveable along a straight line path and a curved path, comprising a central support, elongated transverse supports pivotably connected to said central support and extending from opposite sides of said central support in a direction generally perpendicular to said straight line path, rake means on each of said transverse supports, ground-support wheels on each of said transverse supports, drawbar means connected to said central support and extending generally forwardly of said central support, said drawbar means being connectable to a tractor vehicle, undercarriage means connected to said central support and extending generally rearwardly of said central support, running wheels rotatably mounted on said undercarriage means, pivotal means pivotably supporting said running wheels for pivotable movement about generally vertical axes, and a steering means operably connected between said pivotal means and said draw bar means for pivoting and steering said running wheels in response to alignment changes between the hay-making machine and the tractor vehicle connected to said drawbar means.

2. A hay-making machine according to claim 1, wherein said steering means comprises steering levers operatively connected to said running wheels, said steering levers being pivotal about said vertical axes such that pivoting of said steering levers about said axes effects steering of said running wheels, said steering means further comprising a tie rod pivotably connected to said steering levers.

3. A hay-making machine according to claim 2, wherein said drawbar means comprises a drawbar structure connected to said central support and a pivotal drawbar mounting element pivotably connected to said drawbar structure for pivotable movement about a generally vertical drawbar axis, said drawbar mounting element being connectable to said tractor vehicle, said steering means further comprising a linkage means pivotably connected to said drawbar mounting element for pivotable movement about a generally vertical link axis which is spaced from said drawbar axis, said linkage means being pivotably connected to said tie rod such that pivoting of said drawbar mounting element about said drawbar axis pivots said steering levers to thereby effect steering of said running wheels.

4. A hay-making machine according to claim 3, wherein said linkage means comprises an operating lever pivotably mounted on said undercarriage means and also pivotably connected to said tie rod, said linkage means further comprising linkage parts extending between said operating lever and said drawbar mounting element and pivotably connected to said operating lever and said drawbar mounting element.

5. A hay-making machine according to claim 4, wherein said operating lever is a generally L-shaped lever having two leg portions joined at a juncture, said operating lever being pivotably mounted on said undercarriage means at said juncture, one of said legs being pivotably connected to said tie rod, the other of said legs being pivotably connected to said linkage parts.

6. A hay-making machine according to claim 3, wherein said pivotal drawbar mounting element has a central part and two generally lateral parts extending generally transversely of said straight line path, said central part being pivotably connected to said drawbar structure, each of said lateral parts having tractor vehicle-connecting means for connection to a tractor vehicle.

7. A hay-making machine according to claim 4, wherein said linkage parts comprises an intermediate link element, and support means on said central support moveably supporting said intermediate link element, said linkage parts further comprising end link parts pivotably connected to said intermediate link element.

8. A hay-making machine according to claim 7, wherein said intermediate link element is elongated and has a longitudinal axis, said support means slidably supporting said intermediate link element for movement along said longitudinal axis.

9. A hay-making machine according to claim 4, wherein said linkage parts comprise an intermediate link lever pivotably mounted on said central support, said linkage parts further comprising end link parts pivotably connected to said intermediate link lever.

10. A hay-making machine according to claim 3, wherein said linkage means comprises hydraulically operated means.

* * * * *